J. W. CAIN.
WINDOW WIPER.
APPLICATION FILED JUNE 22, 1911.
1,032,377.
Patented July 16, 1912.
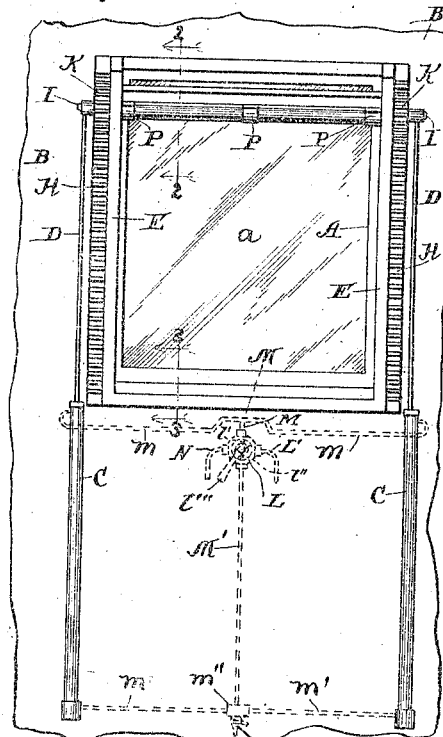
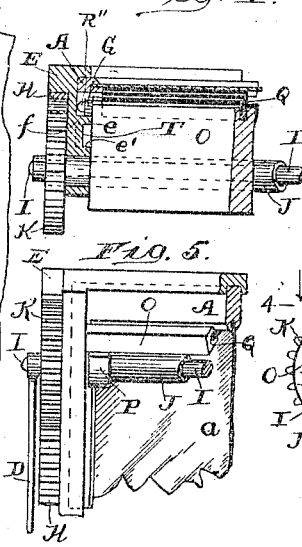
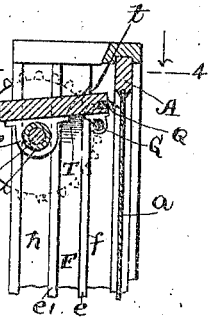
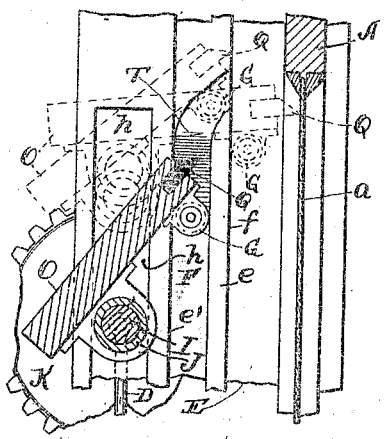
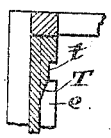
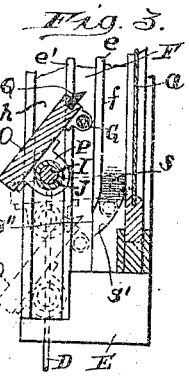
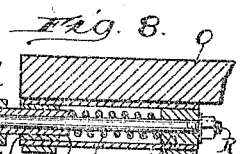
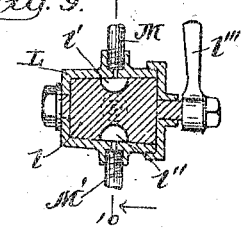
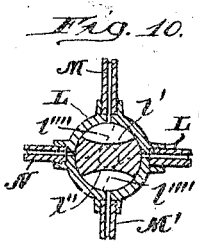
Witnesses:
Chas. E. Gorton
E. A. Adams
Inventor
John W. Cain,
By Charles Turner Brown,
Atty.

UNITED STATES PATENT OFFICE.

JOHN W. CAIN, O CHICAGO, ILLINOIS.

WINDOW-WIPER.

1,032,377.

Specification of Letters Patent.   Patented July 16, 1912.

Application filed June 22, 1911. Serial No. 634,685.

*To all whom it may concern:*

Be it known that I, JOHN W. CAIN, a citizen of the United States, residing at Chicago, in the county of Cook and State of Illinois, have invented certain new and useful Improvements in Window-Wipers, of which the following is a specification.

This invention relates to a window wiping device for vehicles.

To those skilled in the art to which it pertains it is known that mist, rain, sleet, frost or snow on the outside of the window in front of the engineer, motorman, chauffeur or driver of a steam, electric, cable, gasolene or otherwise propelled vehicle, interferes with the vision of such engineer, motorman, chauffeur or driver, and that delays and accidents are caused thereby.

The object of this invention is to obtain a window wiper for the outside of the window which is in front of the person who is directly in control of the movement of a vehicle of the kind mentioned.

In the drawing Figure 1 is a front elevation of the outside of the middle window of an ordinary electric street car with the device embodying my invention illustrated in elevation in operative position thereon. Fig. 2 is a vertical section on an enlarged scale, of the window, of a car and of a device embodying the invention, on line 2—2 of Fig. 1, viewed in the direction indicated by the arrows. Fig. 3 is a vertical section on an enlarged scale, of the window of a car and of a device embodying the invention, on line 3—3 of Fig. 1, viewed in the direction indicated by the arrows. Fig. 4 is a section, on an enlarged scale, on line 4—4 of Fig. 2, viewed in the direction indicated by the arrows. Fig. 5 is a fragmental view, on an enlarged scale, of one of the upper corners of the device. Fig. 6 is a detail view, partly in section, on an enlarged scale, of the upper portion of one side of the device. Fig. 7 is a sectional detail view of the upper end of the middle guide way illustrated in Fig. 2, looking toward the right as viewed in said Fig. 2. Fig. 8 is a sectional view of the track engaging mechanism on the wiping base of the device, and of a portion of said base. Fig. 9 is a central sectional view of a four way cock forming an element of the device and Fig. 10 is a sectional view of the cock illustrated in Fig. 9, on line 10—10 of Fig. 9, viewed in the direction indicated by the arrows.

Similar letters refer to similar parts throughout the several views.

A is a window sash and $a$, $a$, glass in the sash A.

B is a portion of a front of a car.

C, C, are cylinders, provided with pistons and D, D, are the stems of said pistons.

E, E, are bases which are attached respectively to the car front B at the side of the window sash A. Base E is provided with the ribs $e$ and $e'$, which are parallel and with groove F between ribs $e$, $e'$.

$f$ is the face of the rib $e$ which is adjacent to the car window, and on which the roller G (see Figs. 2, 3, and 6) travels when the wiper of the device is moved downward.

H is a gear rack on base E.

$h$ is a slot in base E. Slot $h$ extends from near one end of the base to near the other end thereof.

I is a rod which is attached at its ends to the ends of the piston rods D.

J is a tube mounted on rod I. The tube J is rotatable on rod I, and extends through the slot $h$. As the piston stems D, D, move up and down in the operation of the device the tube J moves freely in said slot $h$ of base E.

K, K, are gears which are rigidly secured to the ends of tube J. Gears K, K, mesh with racks H (see Figs. 1, 4 and 5).

L is a four way cock and L' (see Fig. 10) is a pipe from a source of supply of air under pressure.

$l$ is the plug of cock L. Plug $l$ is provided with recesses $l'$, $l''$, and with handle $l'''$.

M, M', are pipes which are provided with branch pipes $m$, and $m'$, arranged to form conduits from four way cock L to the ends of cylinders C. Branch pipes $m'$ are joined to pipe M' by T $m''$ in the usual way.

N is a discharge or spill pipe from the cock L.

$n$ is a blow off or spill cock in the T $m''$. Cylinders C, pipe M', and branches $m'$ are opened to the atmosphere or closed therefrom by means of cock $n$. The recesses $l'$ and $l''$ in plug $l$ are so arranged relative to the pipes L', M, M' and N, that when the pipe L' is put into communication with pipe M', by turning plug $l$ of cock L to the position indicated by broken lines $l''''$ in Fig. 10, the pipe M is put into communication with spill way N. By this arrangement when air under pressure is admitted to one end of cylinders C (by turning plug $l$), the air in said cylinders on the other side of the pistons may flow from the cylinders through the branch pipes connected to the other ends of said cylinders, and flow to waste through pipe N.

O is a base board pivotally mounted on tube J by bearing P.

Q is a rubber wiper in board O. The roller G, hereinbefore referred to as traveling on track $f$ and in groove F, is mounted on spindle R, which is longitudinally movable in bearings R', R', and said bearings are attached to base board O (see Figs. 2, 3, 6, and 8). Spindle R is provided with rounded end R'', and sleeve $r$, and $r'$ is a spring which abuts against one of the bearings R' at one end and against sleeve $r$ at its other end. At the lower end of rib $e$ (see Fig. 3), there is placed the inclined plane S, so that as the roller G travels down on track or face $f$ of rib $e$, the rounded end R'' is received on the inclined plane S and said bolt is forced inward by said inclined plane, carrying therewith the roller G.

S' is a curved wall which guides the roller G into the groove F, and S'' is the discharge end of inclined plane S. When roller G passes from the discharge end S'' of inclined plane S it is delivered into the groove F.

T is an inclined plane at the upper end of the groove F which discharges the roller G onto side, face or track $f$ of rib $e$, as the piston stems D reach the upper end of their travel (see Figs. 2 and 6). The rib $e$ is cut through at $t$ to permit roller G to move from groove F on to track $f$, (see Fig. 7). The function of the tube J, gears K, and rack H are to maintain the rod I at right angles to the piston stems D, D, particularly when any obstruction is in or on the slot $h$, groove F or track $f$.

The operation is, as either piston stem D moves up or down the gear K adjacent thereto is turned by its engagement with rack H, thus turning the tube J to which the gears K are rigidly secured, and by the turning of said tube the gear at the other end thereof travels along its rack an equal distance to the travel of the one which is moved by the piston stem.

The operation of the device is:—When air is admitted to cylinders C, below the pistons therein stems D are raised, raising rod I, tube J and baseboard O. The roller G is in groove F as piston stems D move up and wiper Q is not in contact with glass $a$. As piston stems D reach the upward limit of their movement roller G is moved onto track $f$ (by inclined plane T), and wiper Q is thereby brought into contact with glass $a$. The handle $l'''$ of cock L is then turned to release the air under the pistons in cylinders C, C, and to admit air above said pistons. The piston stems D are moved down carrying the rod I, tube J and base board O, with wiper Q in contact with glass $a$, cleaning said glass. As piston stems D reach the downward limit of their movement the rollers G are transferred to groove F by the inclined plane S' and wiper Q is thereby moved from contact with glass $a$. The several parts of the device are thus placed in position to have the operation thereof repeated when desired.

I claim:—

1. In a window cleaner, the combination with a rod and means to simultaneously advance both ends thereof at the same rate and in the same direction, of a sleeve pivotally mounted thereon, a wiping element carried by said sleeve, movable abutments carried by said wiping element, means to yieldingly hold said abutments in an advanced position, parallel tracks with which said movable abutments are engageable, means at the tops and bottoms of said tracks to transfer said yielding abutment from one track to the other and carry the wiper into and out of contact with a window.

2. In a window cleaner, the combination with a rod and means to simultaneously advance both ends thereof at the same rate and in the same direction, of a sleeve pivotally mounted thereon, a wiping element carried by said sleeve, movable abutments carried by said wiping element, means to yieldingly hold said abutments in an advanced position, parallel tracks with which said movable abutments are engageable, inclined planes at the upper ends of one and at the lower ends of the other of said parallel tracks, the receiving ends of said inclined planes in one of the parallel tracks and the discharging ends in the other, said inclined planes arranged to transfer the yielding abutments from one to the other of the parallel tracks and carry the wiper into and out of contact with a window.

JOHN W. CAIN.

In the presence of—
HENRY ECKHARDT,
CHARLES TURNER BROWN.